United States Patent
Hachiya

(10) Patent No.: US 7,426,121 B2
(45) Date of Patent: Sep. 16, 2008

(54) OUTPUT VOLTAGE DETECTION CIRCUIT, ISOLATED SWITCHING POWER SUPPLY, AND SEMICONDUCTOR DEVICE

(75) Inventor: Yoshiaki Hachiya, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 259 days.

(21) Appl. No.: 11/500,457

(22) Filed: Aug. 8, 2006

(65) Prior Publication Data

US 2007/0047269 A1    Mar. 1, 2007

(30) Foreign Application Priority Data

Aug. 31, 2005    (JP) ............................. 2005-250399

(51) Int. Cl.
*H02M 3/335* (2006.01)
(52) U.S. Cl. ..................... 363/21.17; 363/65; 363/95; 323/272
(58) Field of Classification Search ............... 363/65, 363/95, 97, 98, 21.16, 21.17, 71, 67, 16; 323/267, 271, 272, 273, 222
See application file for complete search history.

(56) References Cited

U.S. PATENT DOCUMENTS

| | | | |
|---|---|---|---|
| 6,249,444 B1* | 6/2001 | Cross | 363/21.03 |
| 6,853,568 B2* | 2/2005 | Li et al. | 363/65 |
| 6,922,345 B2* | 7/2005 | Nishida et al. | 363/21.16 |
| 6,963,496 B2* | 11/2005 | Bimbaud | 363/21.16 |

FOREIGN PATENT DOCUMENTS

JP    2002-136114    5/2002

* cited by examiner

*Primary Examiner*—Rajnikant B Patel
(74) *Attorney, Agent, or Firm*—Steptoe & Johnson LLP

(57) ABSTRACT

An output voltage detection circuit is provided for accurately detecting a secondary side output voltage based on a voltage induced to an auxiliary winding in an isolated switching power supply including a transformer having the auxiliary winding. A voltage waveform processing circuit (10-1) processes the waveform of the voltage induced to the auxiliary winding (7-3), a hold circuit (10-2) holds the voltage peak value after the processing, a secondary side current detection circuit (24) detects a period during which current passes through a secondary side winding (7-2), a correction circuit (22) performs correction to decrease the peak voltage which has been held by the hold circuit (10-2) during the period, and the corrected voltage is fed back to a control circuit (9). Meanwhile, a reset circuit (23) resets, for a fixed period after the current passes through the secondary side winding (7-2), the peak voltage having been held by the hold circuit (10-2).

19 Claims, 9 Drawing Sheets

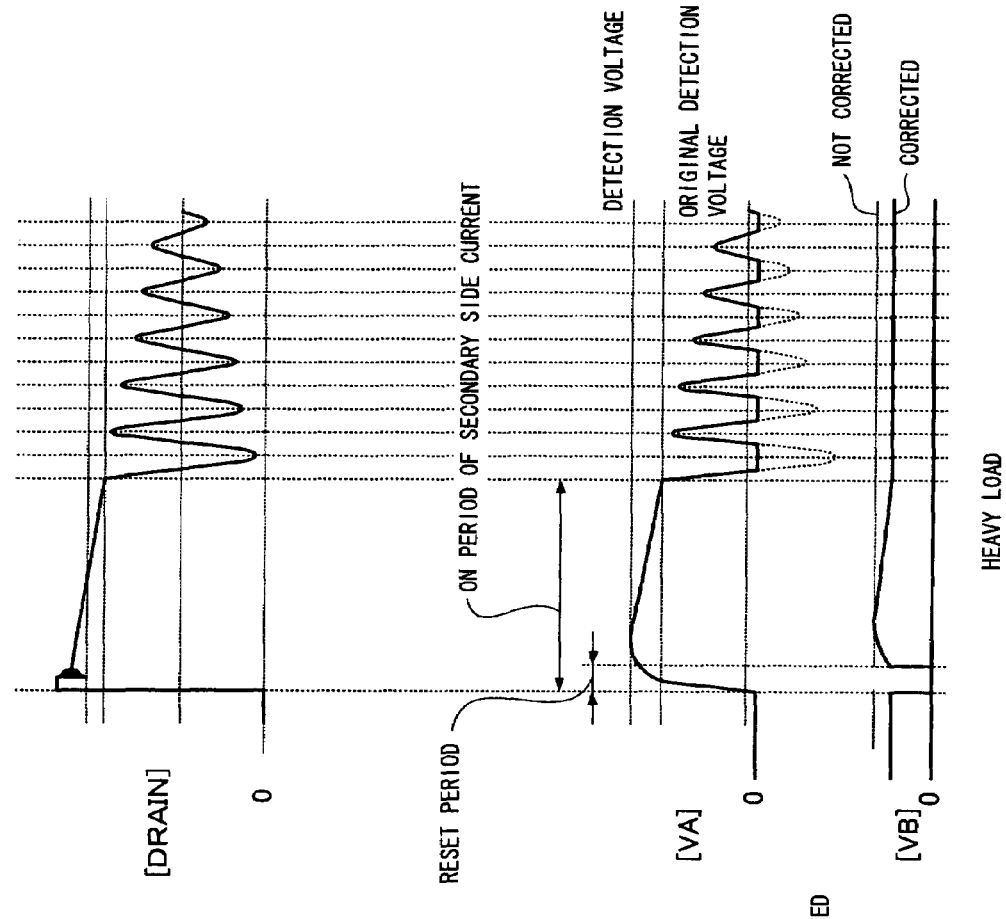
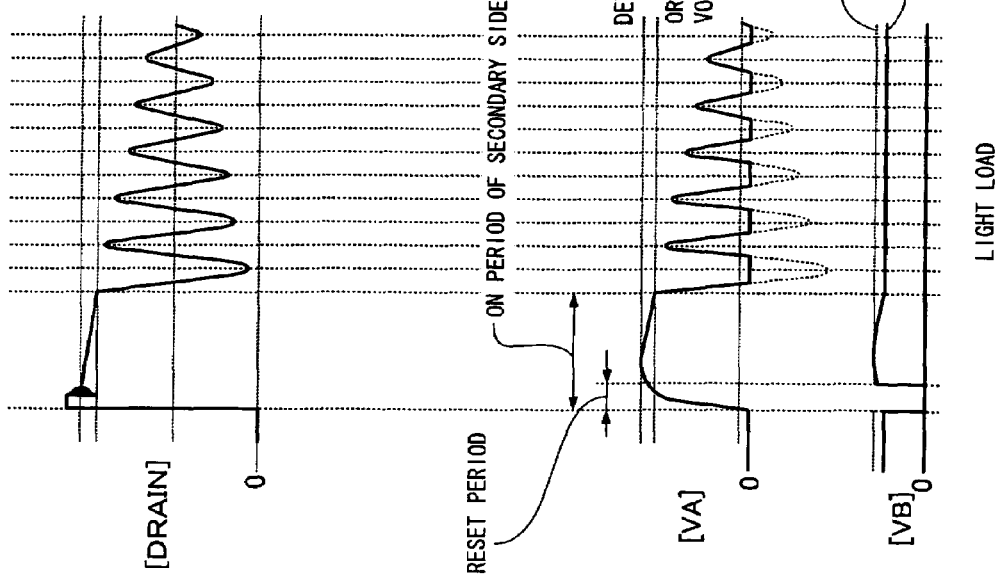
FIG. 6A
FIG. 6B

US 7,426,121 B2

OUTPUT VOLTAGE DETECTION CIRCUIT, ISOLATED SWITCHING POWER SUPPLY, AND SEMICONDUCTOR DEVICE

FIELD OF THE INVENTION

The present invention relates to an output voltage detection circuit for detecting a secondary side output voltage based on a voltage induced to an auxiliary winding (bias winding) of a transformer in an isolated switching power supply, an isolated switching power supply including the output voltage detection circuit, and a semiconductor device in which a control circuit of the isolated switching power supply and the output voltage detection circuit are formed on the same substrate.

BACKGROUND OF THE INVENTION

Conventionally, isolated switching power supplies are known in which the state of the output side (secondary side) is transmitted as a feedback signal to a control circuit through an auxiliary winding of a transformer (For example, Japanese Patent Laid-Open No. 2002-136114).

FIG. 8 shows an isolated switching power supply including a conventional output voltage detection circuit. The switching power supply includes the output voltage detection circuit which detects a secondary side output voltage based on a voltage induced to an auxiliary winding.

The following will describe the switching power supply of FIG. 8.

A rectifier circuit 2 rectifies alternating voltage from an alternating current power supply 1. A smoothing capacitor 3 smoothes the rectified voltage from the rectifier circuit 2. The smoothed voltage is applied to a primary side winding 7-1 of a transformer 7.

A regulator 4 gradually charges a capacitor 5 based on the voltage from the smoothing capacitor 3 and operates so as to always keep the voltage across the capacitor 5 at a fixed value.

A control circuit 9 operated by the voltage across the capacitor 5 as the power supply voltage controls the on/off of a switching element 8 connected to the primary side winding 7-1, in a period during which the voltage across the capacitor 5 is within the range of a starting voltage to a stopping voltage which have been defined in the control circuit 9.

When the voltage across the capacitor 5 reaches the starting voltage and the control circuit 9 starts controlling the on/off of the switching element 8, power supply from the primary side winding 7-1 to a secondary side winding 7-2 and an auxiliary winding 7-3 is started. The switching power supply is a flyback power supply in which the primary side winding 7-1 and the secondary side winding 7-2 of the transformer 7 are opposite in polarity.

A capacitor 16 is a Y capacitor for removing noise.

A snubber circuit 6 clamps the peak voltage of the primary side winding 7-1. The snubber circuit 6 prevents a high spike voltage occurring when the switching element 8 is in a transition between on and off.

Voltage induced to the secondary side winding 7-2 is rectified and smoothed by a diode 11, capacitors 12 and 14, and a choke coil 13. As a result, direct-current power is supplied to a load 15. The voltage across the load 15 is the output voltage of the secondary side.

Since the auxiliary winding 7-3 of the transformer 7 has the same polarity as the secondary side winding 7-2, a voltage proportionate to the voltage induced to the secondary side winding 7-2 is induced to the auxiliary winding 7-3.

The capacitor 5 is connected to the auxiliary winding 7-3 via a diode 35, and the voltage across the capacitor 5 changes in proportion to the voltage induced to the auxiliary winding 7-3. For example, when the load 15 increases, the peak value of the voltage across the secondary side winding 7-2 decreases, and thus the peak value of the voltage across the auxiliary winding 7-3 and the voltage across the capacitor 5 also decrease. Conversely, when the load 15 decreases, the peak value of the voltage across the secondary side winding 7-2 increases, and thus the peak value of the voltage across the auxiliary winding 7-3 and the voltage across the capacitor 5 also increase.

For this reason, a conventional output voltage detection circuit 34 detects the voltage across the capacitor 5 as secondary side output voltage, and feeds back the voltage to the control circuit 9.

Referring to FIGS. 9A and 9B, the following will describe the operations of the conventional isolated switching power supply of FIG. 8 at a light load and a heavy load respectively. FIGS. 9A and 9B show voltage waveforms on each point of a light load and a heavy load, respectively, in the conventional isolated switching power supply of FIG. 8.

In FIGS. 9A and 9B, DRAIN represents a voltage on the high-potential side of the switching element 8, VA' represents a voltage induced to the auxiliary winding 7-3, and VB' represents a voltage obtained by rectifying and smoothing, through the diode 35 and the capacitor 5, the voltage having been induced to the auxiliary winding 7-3.

The conventional output voltage detection circuit 34 detects the voltage VB' across the capacitor 5 as secondary side output voltage. Since the voltage VB' corresponds to the peak value of the voltage VA' induced to the auxiliary winding 7-3, as shown in FIGS. 9A and 9B, the conventional output voltage detection circuit 34 detects a higher voltage (the voltage having been clamped by the snubber circuit 6) than the original detection voltage.

Further, the conventional output voltage detection circuit 34 does not detect a voltage generated on the auxiliary winding 7-3 but detects the waveform of a voltage which is generated on the auxiliary winding 7-3 and reduced by the diode 35 and the capacitor 5. Therefore, the voltage detected by the output voltage detection circuit 34 is varied by the diode 35 and the capacitor 5.

Moreover, the voltage detected by the conventional output voltage detection circuit 34 is affected by the forward voltage variation components of the diode 11 on the secondary side.

When the forward voltage variations of the diode 11 on the secondary side are cancelled by the forward voltage variations of the diode 35 in the conventional isolated switching power supply, the isolated switching power supply can be used only for a low output power supply.

As described above, in the conventional output voltage detection circuit, the detection voltage is higher than the original detection voltage, causing a large detection error. Further, in the conventional output voltage detection circuit, the accuracy of detection considerably varies due to the variations of the diode 35 and the capacitor 5, which rectify and smooth the voltage having been induced to the auxiliary winding 7-3, and the forward voltage variation components of the diode 11 on the secondary side.

Therefore, the isolated switching power supply using the conventional output voltage detection circuit has a poor load regulation characteristic, which is a power supply characteristic. Moreover, the isolated switching power supply using the conventional output voltage detection circuit is difficult to be applied to a high output power supply.

DISCLOSURE OF THE INVENTION

In view of the problems, an object of the present invention is to provide an output voltage detection circuit which can accurately detect a secondary side output voltage of an isolated switching power supply, an isolated switching power supply including the output voltage detection circuit, and a semiconductor device in which a control circuit of the isolated switching power supply and the output voltage detection circuit are formed on the same substrate.

In order to attain the object, according to the present invention, a waveform of voltage induced to an auxiliary winding is processed, a peak value of the voltage is held after the processing, the held peak voltage is corrected so as to decrease during a period in which current passes through a secondary side winding, the corrected voltage is fed back to the control circuit of the isolated switching power supply as a detected value of secondary side output voltage, and the held peak voltage is reset for a fixed period of time after the current starts passing through the secondary side winding.

To be specific, an output voltage detection circuit of the present invention is incorporated into an isolated switching power supply comprising a transformer having a primary side winding, a secondary side winding, and an auxiliary winding, a switching element connected to the primary side winding, and a control circuit for controlling the on/off of the switching element, the output voltage detection circuit generating detection voltage as a detected value of secondary side output voltage based on voltage generated on the auxiliary winding, and feeding back the voltage to the control circuit. The output voltage detection circuit comprises a secondary side current detection circuit connected to the auxiliary winding and detecting a period during which current passes through the secondary side winding, a voltage waveform processing circuit connected to the auxiliary winding and processing the waveform of the voltage generated on the auxiliary winding, a hold circuit connected to the output stage of the voltage waveform processing circuit and holding the peak voltage of the voltage having been processed by the voltage waveform processing circuit, a correction circuit connected to the output stage of the hold circuit, and correcting the peak voltage having been held by the hold circuit and generating the detection voltage in the period having been detected by the secondary side current detection circuit, and a reset circuit for resetting, for a fixed period of time after the current starts passing through the secondary side winding, the detection voltage having been generated by the correction circuit.

According to the present invention, the correction circuit corrects the peak voltage having been held by the hold circuit, so that the detection voltage can be corrected to the level of an original detection voltage. Thus, according to the present invention, it is possible to improve the accuracy of detecting an output voltage and improve a load regulation characteristic which is a significant power supply characteristic of the isolated switching power supply.

Further, according to the present invention, an output voltage can be accurately detected based on the voltage induced to the auxiliary winding, and thus it is possible to eliminate the need for a feedback circuit, which is made up of a photocoupler, a shunt regulator, and so on, on the output side (secondary side) of the isolated switching power supply. Thereby, miniaturization of the isolated switching power supply can be realized.

In the output voltage detection circuit of the present invention, the voltage waveform processing circuit includes a diode.

According to the present invention, the waveform of the voltage induced to the auxiliary winding can be processed by the diode included in the voltage waveform processing circuit into a waveform not largely swayed toward the minus side. Thereby, a stable operation of the switching power supply can be achieved.

Moreover, in the output voltage detection circuit of the present invention, the voltage waveform processing circuit includes a capacitor for rendering a rising waveform of the voltage generated on the auxiliary winding less steep.

According to the present invention, the capacitor included in the voltage waveform processing circuit can prevent ringing caused by leakage inductance, thereby further improving the accuracy of detecting an output voltage.

Further, in the output voltage detection circuit of the present invention, the hold circuit includes a diode and a capacitor and outputs the voltage across the capacitor.

Moreover, in the output voltage detection circuit of the present invention, the correction circuit discharges the capacitor included in the hold circuit at a predetermined current value.

According to the present invention, the capacitor for holding the peak value of the voltage after the processing of the voltage waveform processing circuit can be discharged at the predetermined current value during the period in which the current passes through the secondary side of the transformer, so that a reliable correction of the correction circuit can be achieved.

Moreover, in the output voltage detection circuit of the present invention, the correction circuit discharges the capacitor included in the hold circuit at a value of current passing through the auxiliary winding.

According to the present invention, the capacitor for holding the peak value of the voltage after the processing of the voltage waveform processing circuit can be discharged, at the value of the current passing through the auxiliary winding, during a period in which the current passes through the secondary side of the transformer, thus achieving a more reliable correction of the correction circuit.

An isolated switching power supply of the present invention comprises a transformer having a primary side winding, a secondary side winding, and an auxiliary winding, a switching element connected to the primary side winding, a control circuit for controlling on/off of the switching element, and the above mentioned output voltage detection circuit, the isolated switching power supply further comprising a regulator for generating the operating voltage of the control circuit and the output voltage detection circuit based on an input voltage applied to the primary side winding.

According to the present invention, the regulator can keep constant the operating voltage of the control circuit in the isolated switching power supply and the control circuit can stably control the on/off of the switching element.

In the isolated switching power supply of the present invention, the control circuit causes the regulator to stop generating the operating voltage when the operating voltage generated by the regulator is higher than or equal to the fixed value, and generates the operating voltage based on the voltage generated on the auxiliary winding.

According to the present invention, the operating voltage can be generated based on the voltage induced to the auxiliary winding of the transformer, and thus power consumption can be reduced on the primary side.

In the semiconductor device of the present invention, the output voltage detection circuit, the control circuit, and the regulator of the isolated switching power supply are formed on the same substrate.

The present invention can miniaturize the isolated switching power supply.

As described above, the present invention makes it possible to accurately detect an output voltage in a device using electromagnetic induction phenomenon, and thus the present invention is useful to a switching power supply.

Further, the present invention can be generally used for devices and equipments having switching power supplies.

The present invention is particularly useful to devices and equipments of which miniaturization is demanded.

BRIEF DESCRIPTION OF THE DRAWINGS

FIGS. 6A and 6B are diagrams each showing voltage waveforms on each point of the isolated switching power supply including the output voltage detection circuit according to Embodiment 4 of the present invention;

DESCRIPTION OF THE EMBODIMENTS

Embodiment 1

Figure 1:
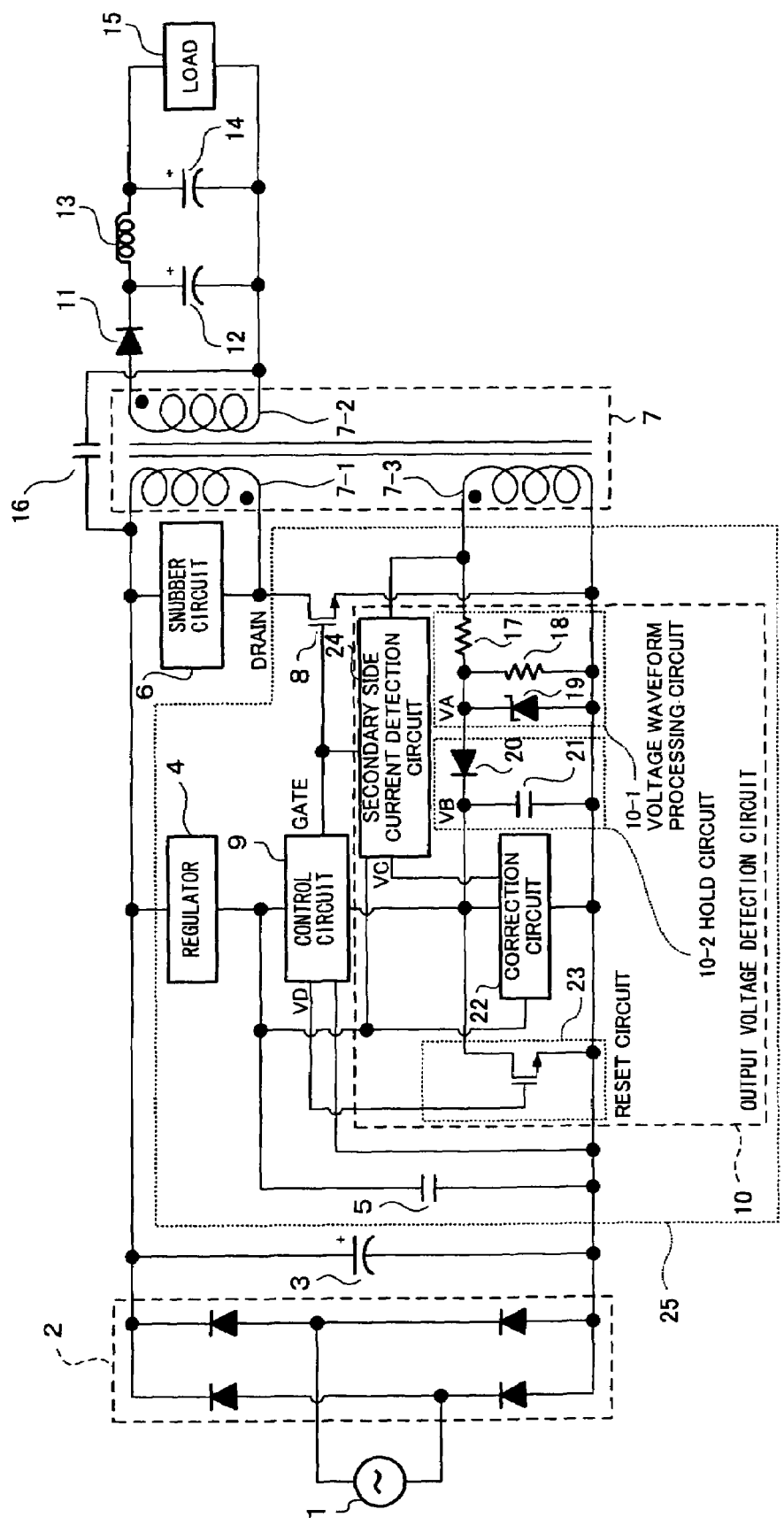
FIG. 1 is a diagram showing an isolated switching power supply including an output voltage detection circuit according to Embodiment 1 of the present invention.
Figure 8:
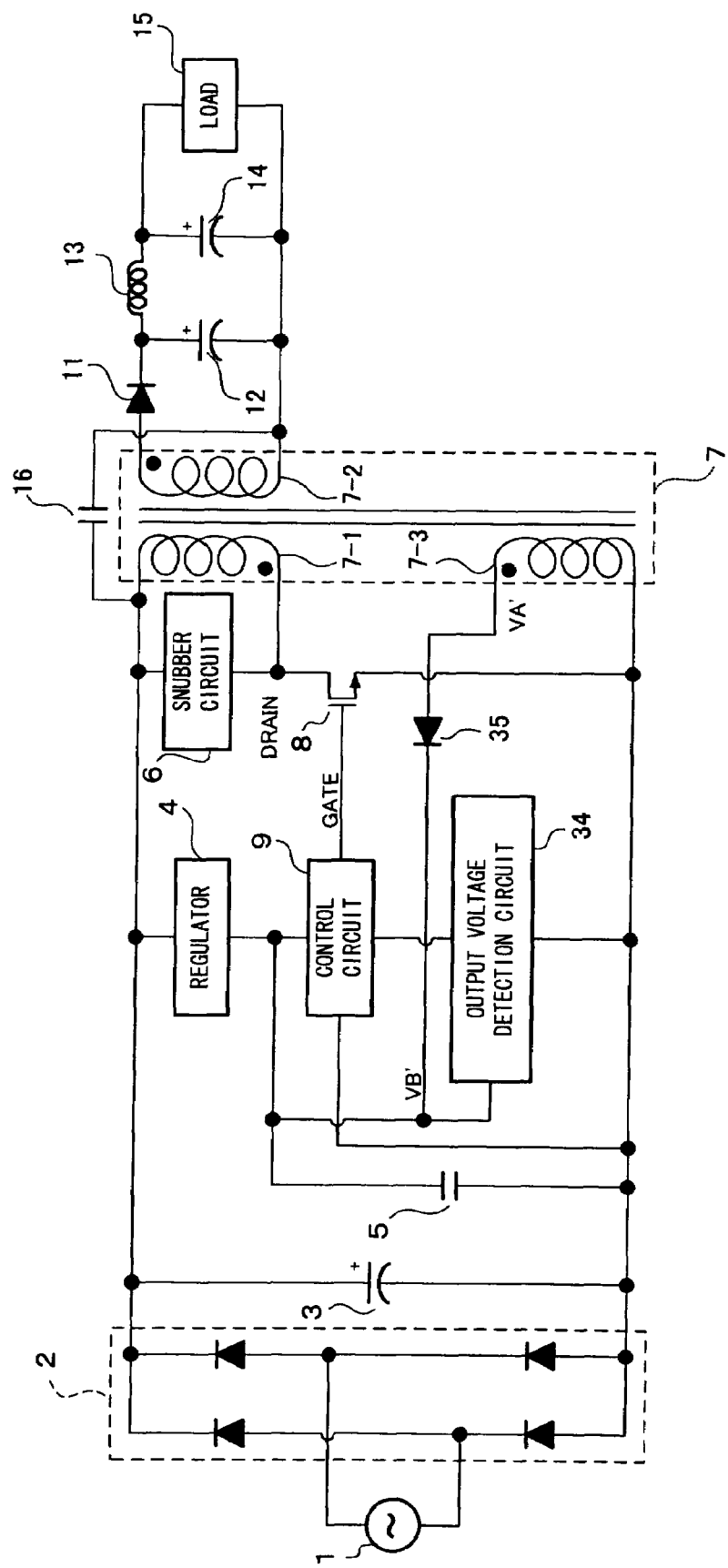
FIG. 8 is a diagram showing an isolated switching power supply including a conventional output voltage detection circuit.
Figure 9A:
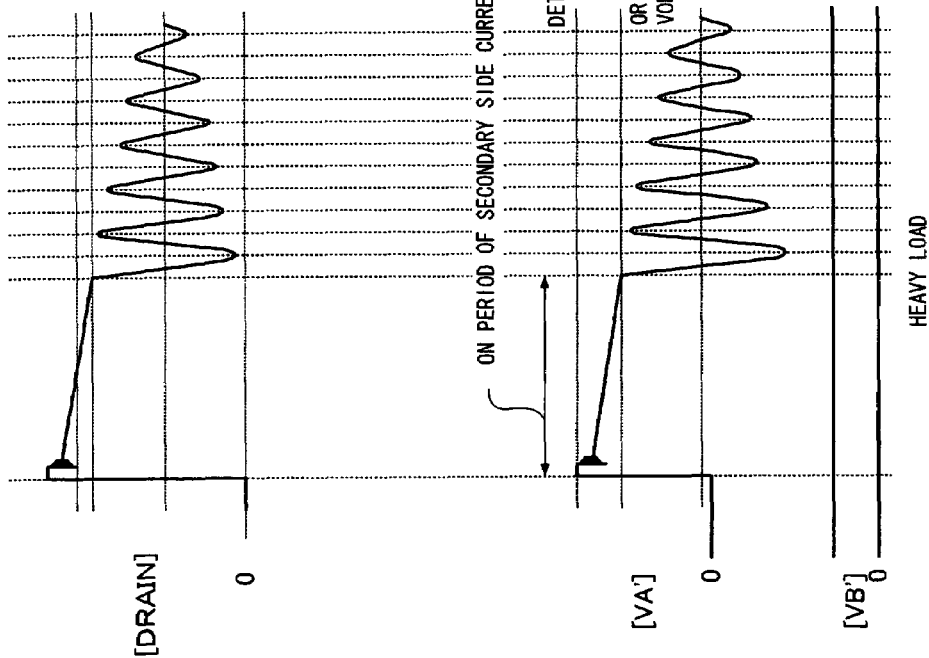
FIGS. 9A and 9B are diagrams each showing voltage waveforms on each point of an isolated switching power supply including a conventional output voltage detection circuit.
Figure 9B:
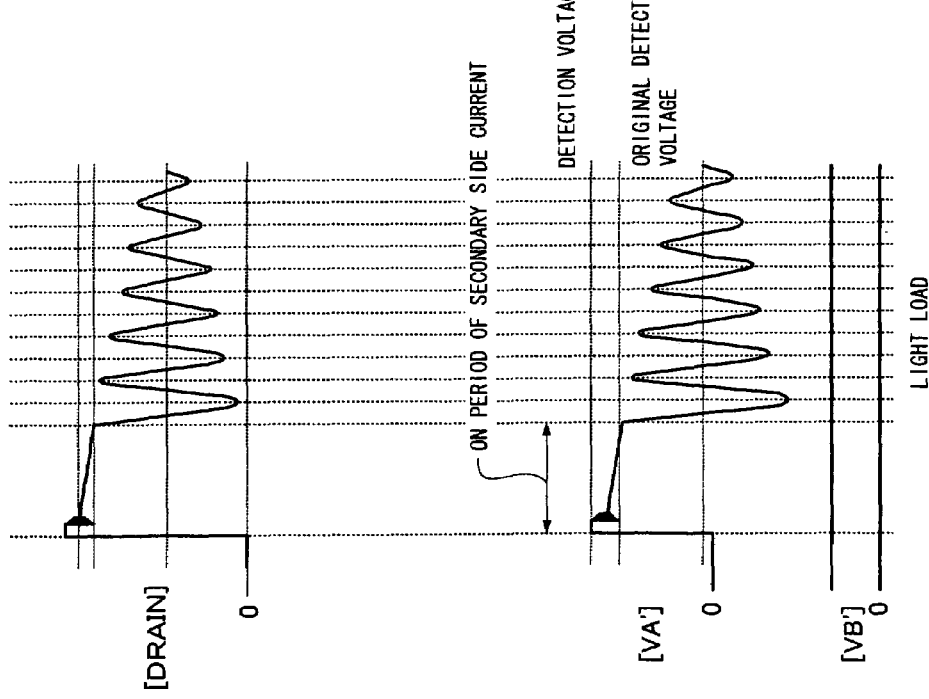

FIG. 1 shows an isolated switching power supply including an output voltage detection circuit according to Embodiment 1 of the present invention. The same members as those of FIG. 8 are indicated by the same reference numerals and the explanation thereof is omitted.

Figure 2B:
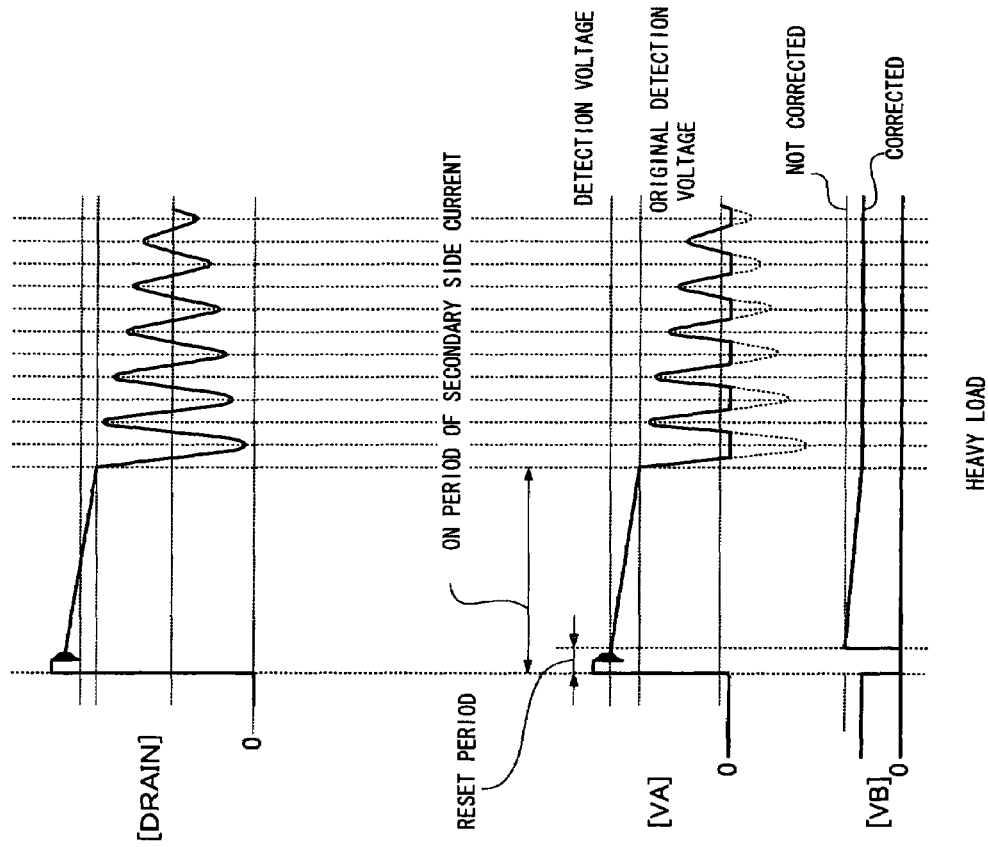
FIGS. 2A and 2B are diagrams each showing voltage waveforms on each point of the isolated switching power supply including the output voltage detection circuit according to Embodiment 1 of the present invention.
Figure 2A:
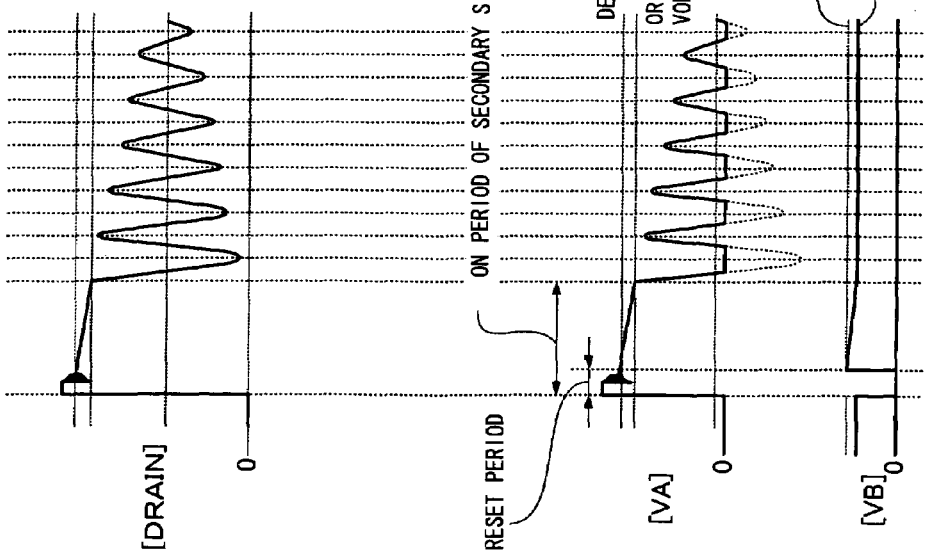

FIGS. 2A and 2B show voltage waveforms on each point of a light load and a heavy load, respectively, in the isolated switching power supply of FIG. 1. In FIGS. 2A and 2B, DRAIN represents a voltage on the high-potential side of a switching element 8, VA represents a voltage generated by a voltage waveform processing circuit 10-1, and VB represents a voltage generated by a hold circuit 10-2.

In FIG. 1, an output voltage detection circuit 10 includes the voltage waveform processing circuit 10-1, the hold circuit 10-2, a correction circuit 22, are set circuit 23, and a secondary side current detection circuit 24.

The voltage waveform processing circuit 10-1 includes a resistor 17 connected to an auxiliary winding 7-3 in series, a resistor 18 connected to the auxiliary winding 7-3 in parallel, and a Schottky diode 19.

The voltage waveform processing circuit 10-1 processes a voltage waveform appearing on the auxiliary winding 7-3 and generates the voltage VA having a waveform shown in FIGS. 2A and 2B.

In other words, the voltage waveform processing circuit 10-1 processes, through the Schottky diode 19, the waveform of voltage induced to the auxiliary winding 7-3 into a waveform not largely falling into the minus side, so that the voltage VA is generated.

The hold circuit 10-2 includes a diode 20 connected to the output stage of the voltage waveform processing circuit 10-1 in series and a capacitor 21 connected to the voltage waveform processing circuit 10-1 in parallel.

The hold circuit 10-2 holds, through the capacitor 21, the peak value of the voltage VA having been generated by the voltage waveform processing circuit 10-1.

A secondary side current detection circuit 24 detects a period from when the switching element 8 is turned off to when the voltage having been induced to the auxiliary winding 7-3 decreases (the on period of secondary side current passing through a secondary-side winding 7-2), based on a signal outputted from a control circuit 9 to the switching element 8 and the voltage having been induced to the auxiliary winding 7-3.

The correction circuit 22 is connected to the output stage of the hold circuit 10-2. As shown in FIGS. 2A and 2B, the correction circuit 22 corrects the voltage having been held by the hold circuit 10-2, so that the voltage decreases during the on period of the secondary side current having been detected by the secondary side current detection circuit 24. In other words, the correction circuit 22 discharges the capacitor 21 in a period during which current passes through the secondary-side winding 7-2 of a transformer 7.

The output voltage detection circuit 10 feeds back to the control circuit 9 the voltage VB having been corrected by the correction circuit 22, as the output voltage of the secondary side.

In the meantime, the control circuit 9 control the reset operation of the reset circuit 23 such that the voltage VB having been held by the hold circuit 10-2 is reset for a predetermined period since the switching element 8 is turned off. With this reset operation, the voltage VB having been generated last time by the hold circuit 10-2 is temporarily reset.

To be specific, the reset circuit 23 includes an NchMOSFET as shown in FIG. 1. The control circuit 9 turns on the NchMOSFET for a fixed period (reset period) immediately after the switching element 8 is turned off, and discharges the capacitor 21 such that the voltage VB reaches the ground potential during the reset period as shown in FIGS. 2A and 2B. After the reset period, the hold circuit 10-2 starts detecting the peak value of the voltage VA.

The control circuit 9 controls the on/off (PWM control, intermittent control, and so on) of the switching element 8 based on the corrected voltage VB in order to control the voltage across a load 15 to a constant voltage.

In the isolated switching power supply according to Embodiment 1, the voltage across a capacitor 5 serves as the power supply voltage of the control circuit 9, the correction circuit 22, and the secondary side current detection circuit 24.

According to Embodiment 1, it is possible to accurately detect a secondary side output voltage regardless of an on/off control system for controlling the switching element through the control circuit.

Further, according to Embodiment 1, it is possible to accurately detect a secondary side output voltage regardless of the magnitude of the output power of the secondary side.

Therefore, according to Embodiment 1, it is possible to obtain a preferable load regulation characteristic.

Moreover, Embodiment 1 can eliminate the need for a typical feedback circuit made up of a photocoupler and a shunt regulator, thereby simultaneously achieving miniaturization and low cost of the overall device.

In the case where a part indicated by reference numeral 25 of FIG. 1 is made up of a single semiconductor package (semiconductor device) formed on the same substrate, the switching power supply can be miniaturized regardless of the number of semiconductor chips in the semiconductor package.

Embodiment 2

Figure 3:
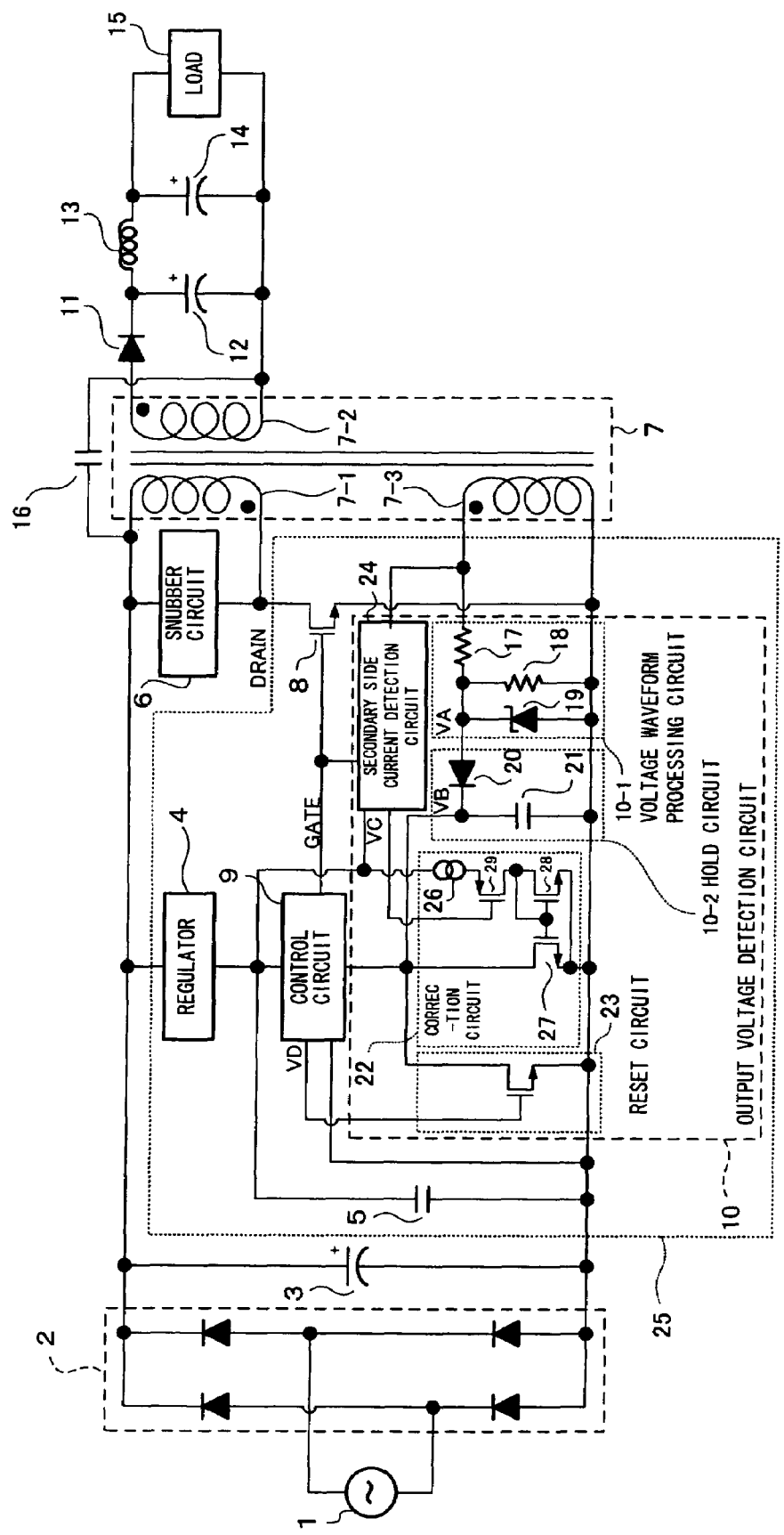
FIG. 3 is a diagram showing an isolated switching power supply including an output voltage detection circuit according to Embodiment 2 of the present invention.

FIG. 3 shows an isolated switching power supply including an output voltage detection circuit according to Embodiment 2 of the present invention. The same members as those of FIGS. 1 and 8 are indicated by the same reference numerals and the explanation thereof is omitted.

In FIG. 3, a correction circuit 22 includes a constant current source 26 connected to a capacitor 5, an NchMOSFET 27 connected to a capacitor 21 included in a hold circuit 10-2, an NchMOSFET 28 forming a current mirror circuit with the NchMOSFET 27, and a PchMOSFET 29 which is connected between the constant current source 26 and the NchMOSFET 28 and turned on/off in response to a signal from a secondary side current detection circuit 24.

The correction circuit 22 turns on the PchMOSFET 29 during the on period of secondary side current, brings the constant current source 26 and the current mirror circuit into conduction, and discharges the capacitor 21 at a predetermined constant current value. In response to the operation of the correction circuit 22, voltage VB held by the hold circuit 10-2 is reduced during the on period of the secondary side current.

Embodiment 3

Figure 4:
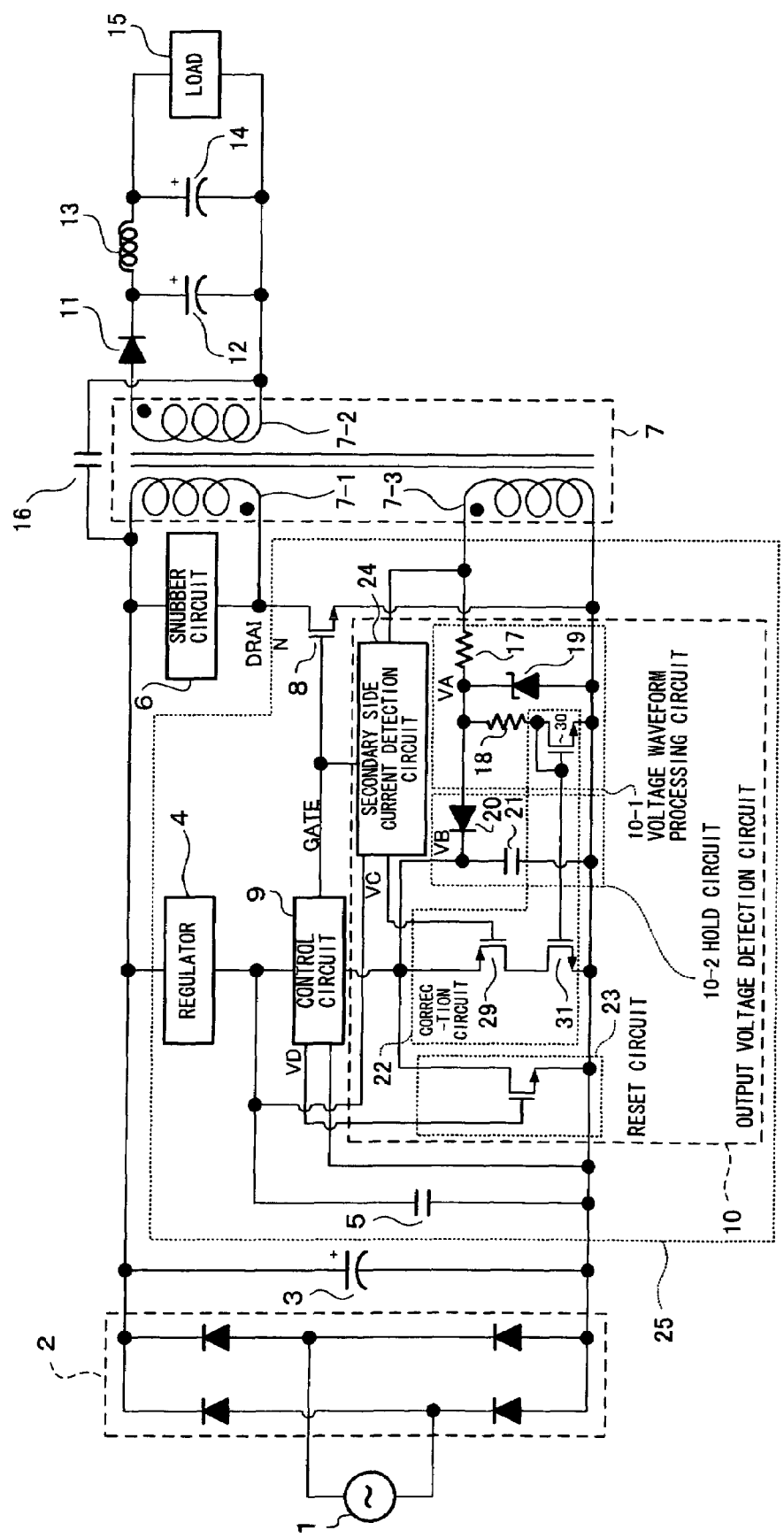
FIG. 4 is a diagram showing an isolated switching power supply including an output voltage detection circuit according to Embodiment 3 of the present invention.

FIG. 4 shows an isolated switching power supply including an output voltage detection circuit according to Embodiment 3 of the present invention. The same members as those of FIGS. 1 and 8 are indicated by the same reference numerals and the explanation thereof is omitted. In an output voltage detection circuit 10 of FIG. 4, the circuit configuration of a correction circuit 22 is different from that of Embodiment 2.

In FIG. 4, the correction circuit 22 includes an NchMOSFET 30 connected to a resistor 18 included in a voltage waveform processing circuit 10-1, an NchMOSFET 31 forming a current mirror circuit with the NchMOSFET 30, and a PchMOSFET 29 which is connected between the NchMOSFET 31 and a capacitor 21 included in a hold circuit 10-2 and is turned on/off in response to a signal from a secondary side current detection circuit 24.

The correction circuit 22 turns on the PchMOSFET 29 during the on period of secondary side current to bring the current mirror circuit into conduction, and discharges the capacitor 21 at a current proportionate to a current passing through the resistor 18. In response to the operation of the correction circuit 22, voltage VB held by the hold circuit 10-2 is reduced during the on period of the secondary side current. The current passing through the resistor 18 is proportionate to the current passing through a secondary-side winding 7-2 of a transformer 7, achieving a correction with higher accuracy.

Embodiment 4

Figure 5:
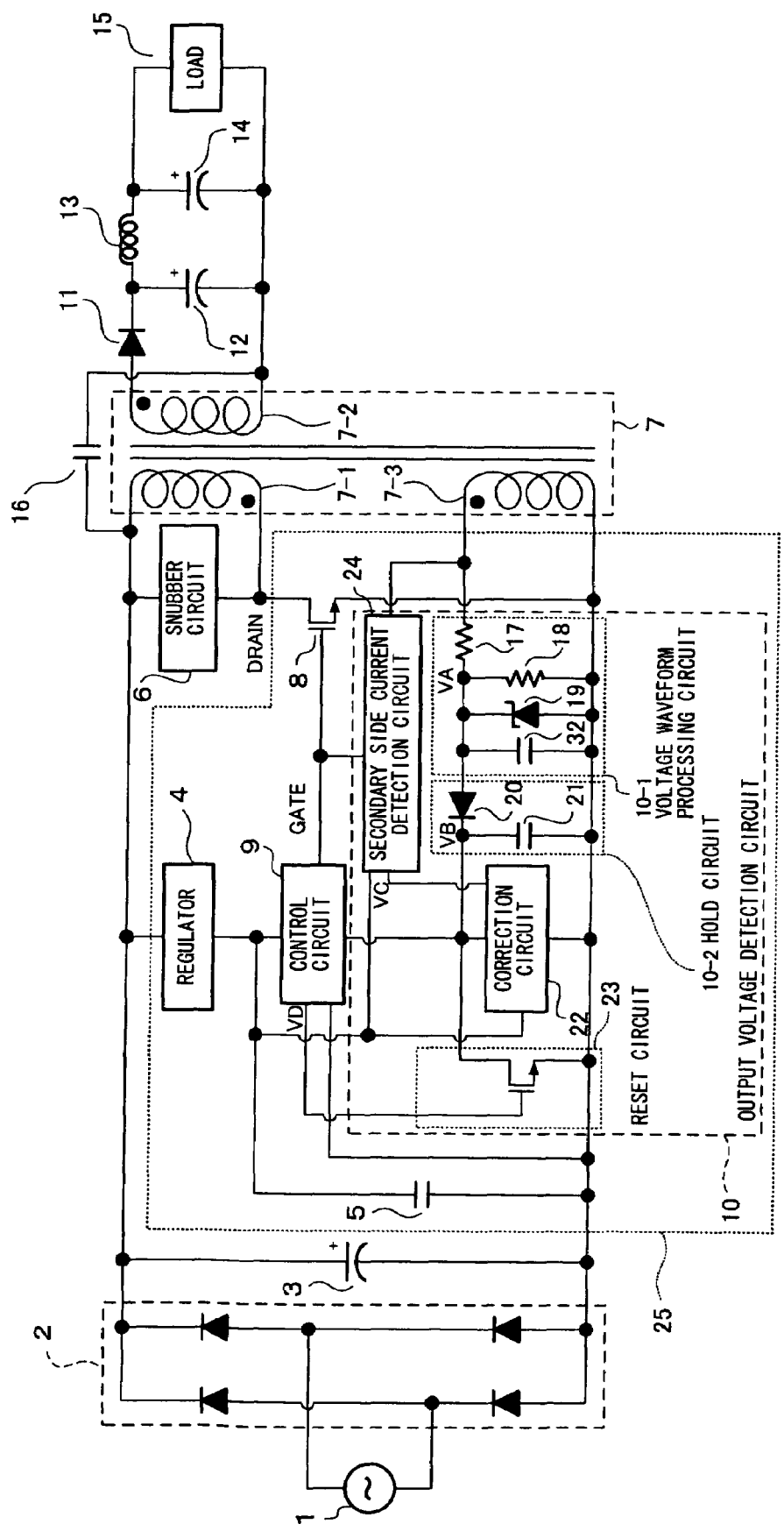
FIG. 5 is a diagram showing an isolated switching power supply including an output voltage detection circuit according to Embodiment 4 of the present invention.

FIG. 5 shows an isolated switching power supply including an output voltage detection circuit according to Embodiment 4 of the present invention. The same members as those of FIGS. 1 and 8 are indicated by the same reference numerals and the explanation thereof is omitted. An output voltage detection circuit 10 of FIG. 5 is different from that of Embodiment 1 in that a capacitor 32 is added to a voltage waveform processing circuit 10-1.

FIGS. 6A and 6B show voltage waveforms on each point of a light load and a heavy load, respectively, in the isolated switching power supply of FIG. 5. In FIGS. 6A and 6B, DRAIN represents a voltage on the high-potential side of a switching element 8, VA represents a voltage generated by a voltage waveform processing circuit 10-1, and VB represents a voltage generated by a hold circuit 10-2.

In the output voltage detection circuit of Embodiment 1, as indicated by VA in FIGS. 2A and 2B, ringing occurs due to the leakage inductance of the transformer 7 during the reset period. For this reason, in the case of large variations in the leakage inductance of the transformer 7, a ringing waveform appears beyond the reset period due to the leakage inductance of the transformer 7 and the ringing affects the output voltage VB of the hold circuit 10-2, so that the output voltage may not be correctly detected.

Thus, as shown in FIG. 5, the capacitor 32 for corrupting the rising edge of the waveform of voltage induced to an auxiliary winding 7-3 is added in the voltage waveform processing circuit 10-1. As indicated by VA in FIGS. 6A and 6B, the voltage induced to the auxiliary winding 7-3 is processed by the capacitor 32 into a waveform where ringing components caused by the leakage inductance of the transformer 7 have been removed. Therefore, the output voltage VB generated by the hold circuit 10-2 is not affected by ringing, achieving stable detection of an output voltage.

Embodiment 5

Figure 7:
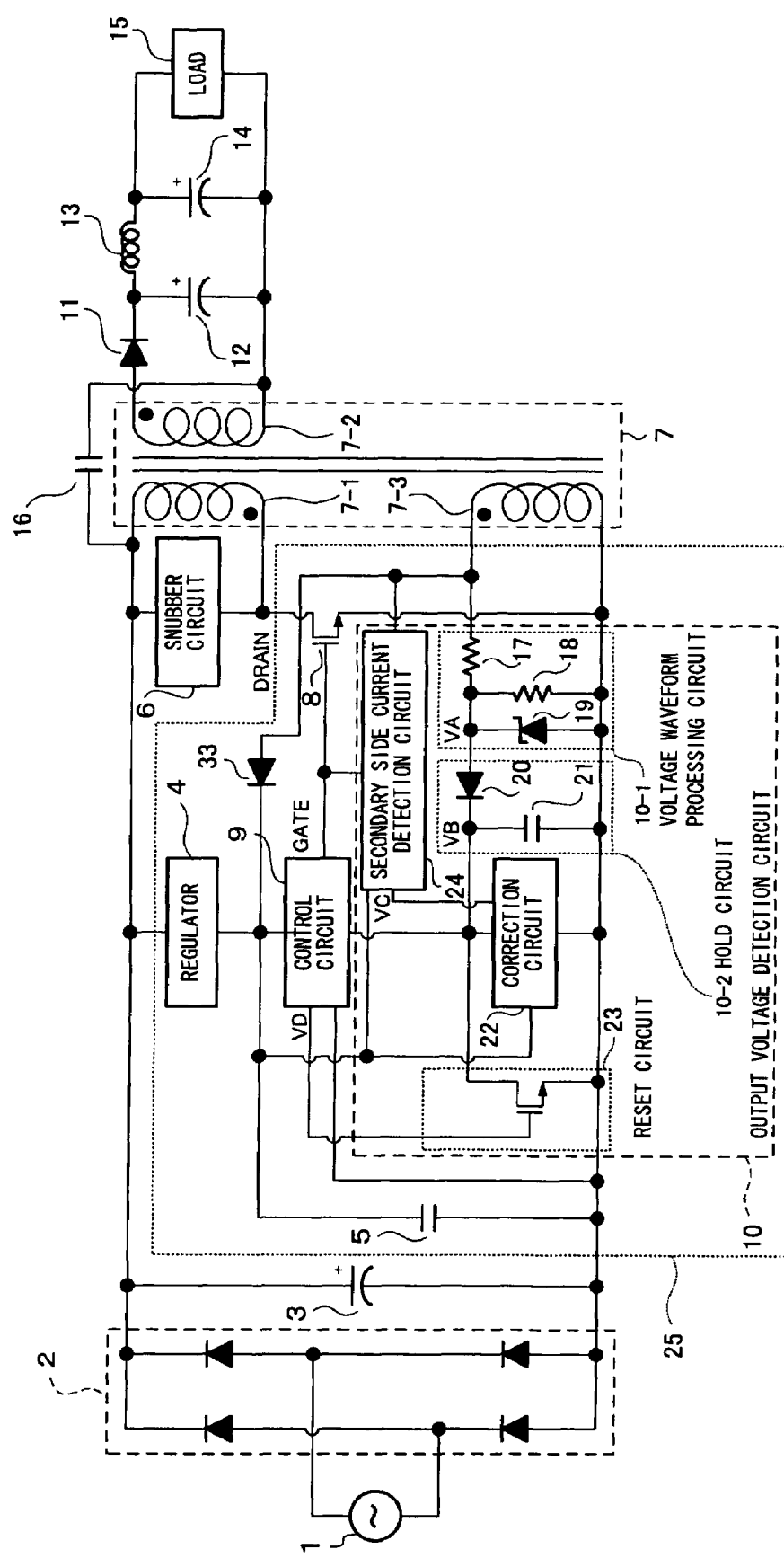
FIG. 7 is a diagram showing an isolated switching power supply including an output voltage detection circuit according to Embodiment 5 of the present invention.

FIG. 7 shows an isolated switching power supply including an output voltage detection circuit according to Embodiment 5 of the present invention. The same members as those of FIGS. 1 and 8 are indicated by the same reference numerals and the explanation thereof is omitted. The switching power supply is different from those of the other embodiments in that the node of a secondary side current detection circuit 24 and an auxiliary winding 7-3 of a transformer 7 is connected to a capacitor 5 via a diode 33.

In the other embodiments described above, the regulator 4 charges the capacitor 5 based on a voltage (input voltage) applied to the primary side winding 7-1, operates so as to always keep the voltage across the capacitor 5 at the fixed value VCC, and generates power supply voltage (operating voltage) during the operation of the output voltage detection circuit 10 and the control circuit 9.

In contrast, in the switching power supply of the present embodiment, when an operating voltage is higher than or equal to a fixed value, power is supplied (charged) to the capacitor 5 based on a voltage induced to the auxiliary winding 7-3 of the transformer 7.

To be specific, when a voltage obtained by adding the forward voltage of a diode 33 to the peak value (the voltage across the capacitor 5 in the circuit of FIG. 7) of the auxiliary winding 7-3 is higher than or equal to a fixed value VCC, a control circuit 9 causes a regulator 4 to stop generating operating voltage and generates operating voltage so as to supply power from the auxiliary winding 7-3 to the capacitor 5 via the capacitor 33.

This operation reduces power consumption on the primary side during operation and thus also achieves energy conservation.

As described above, according to Embodiments 1 to 5, it is possible to improve accuracy of detection in the device including the output voltage detection circuit using electromagnetic induction, thereby simultaneously achieving stable control and miniaturization of the device.

Further, according to Embodiments 1 to 5, the device including the output voltage detection circuit can be applied as devices from a low output device to a high output device.

What is claimed is:

1. An output voltage detection circuit incorporated into an isolated switching power supply comprising:
   a transformer having a primary side winding, a secondary side winding, and an auxiliary winding,
   a switching element connected to the primary side winding, and
   a control circuit for controlling on/off of the switching element,
   the output voltage detection circuit generating detection voltage as a detected value of secondary side output voltage based on voltage generated on the auxiliary winding, and feeding back the detection voltage to the control circuit,
   the output voltage detection circuit, comprising:
   a secondary side current detection circuit connected to the auxiliary winding and detecting a period during which current passes through the secondary side winding,
   a voltage waveform processing circuit connected to the auxiliary winding and processing a waveform of the voltage generated on the auxiliary winding,
   a hold circuit connected to an output stage of the voltage waveform processing circuit and holding a peak voltage of the voltage having been processed by the voltage waveform processing circuit,
   a correction circuit connected to an output stage of the hold circuit, and correcting the peak voltage having been held by the hold circuit and generating the detection voltage in the period having been detected by the secondary side current detection circuit, and
   a reset circuit for resetting, for a fixed period of time after the current starts passing through the secondary side winding, the detection voltage having been generated by the correction circuit.

2. The output voltage detection circuit according to claim 1, wherein the voltage waveform processing circuit includes a diode.

3. The output voltage detection circuit according to claim 2, wherein the voltage waveform processing circuit has a capacitor for rendering a rising waveform of the voltage generated on the auxiliary winding less steep.

4. The output voltage detection circuit according to claim 1, wherein the hold circuit includes a diode and a capacitor and outputs voltage across the capacitor.

5. The output voltage detection circuit according to claim 4, wherein the correction circuit discharges the capacitor included in the hold circuit at a predetermined current value.

6. The output voltage detection circuit according to claim 4, wherein the correction circuit discharges the capacitor included in the hold circuit at a value of current passing through the auxiliary winding.

7. An isolated switching power supply, comprising:
   a transformer having a primary side winding, a secondary side winding, and an auxiliary winding,
   a switching element connected to the primary side winding,
   a control circuit for controlling on/off of the switching element, and
   the output voltage detection circuit according to claim 1,
   the isolated switching power supply further comprising a regulator for generating operating voltage of the control circuit and the output voltage detection circuit based on input voltage applied to the primary side winding.

8. An isolated switching power supply, comprising:
   a transformer having a primary side winding, a secondary side winding, and an auxiliary winding,
   a switching element connected to the primary side winding,
   a control circuit for controlling on/off of the switching element, and
   the output voltage detection circuit according to claim 2,
   the isolated switching power supply further comprising a regulator for generating operating voltage of the control circuit and the output voltage detection circuit based on input voltage applied to the primary side winding.

9. An isolated switching power supply, comprising:
   a transformer having a primary side winding, a secondary side winding, and an auxiliary winding,
   a switching element connected to the primary side winding,
   a control circuit for controlling on/off of the switching element, and
   the output voltage detection circuit according to claim 3,
   the isolated switching power supply further comprising a regulator for generating operating voltage of the control circuit and the output voltage detection circuit based on input voltage applied to the primary side winding.

10. An isolated switching power supply, comprising:
    a transformer having a primary side winding, a secondary side winding, and an auxiliary winding,
    a switching element connected to the primary side winding,
    a control circuit for controlling on/off of the switching element, and
    the output voltage detection circuit according to claim 4,
    the isolated switching power supply further comprising a regulator for generating operating voltage of the control circuit and the output voltage detection circuit based on input voltage applied to the primary side winding.

11. An isolated switching power supply, comprising:
    a transformer having a primary side winding, a secondary side winding, and an auxiliary winding,
    a switching element connected to the primary side winding,
    a control circuit for controlling on/off of the switching element, and
    the output voltage detection circuit according to claim 5,
    the isolated switching power supply further comprising a regulator for generating operating voltage of the control circuit and the output voltage detection circuit based on input voltage applied to the primary side winding.

12. An isolated switching power supply, comprising:
    a transformer having a primary side winding, a secondary side winding, and an auxiliary winding,
    a switching element connected to the primary side winding,
    a control circuit for controlling on/off of the switching element, and
    the output voltage detection circuit according to claim 6,
    the isolated switching power supply further comprising a regulator for generating operating voltage of the control circuit and the output voltage detection circuit based on input voltage applied to the primary side winding.

13. The isolated switching power supply according to claim 7, wherein the control circuit causes the regulator to stop generating operating voltage when the operating voltage generated by the regulator become higher than or equal to a fixed value, and generates operating voltage based on voltage generated on the auxiliary winding.

14. A semiconductor device including the output voltage detection circuit, the control circuit, and the regulator each according to claim 7, which are formed on a same substrate.

15. A semiconductor device including the output voltage detection circuit, the control circuit, and the regulator each according to claim 8, which are formed on a same substrate.

16. A semiconductor device including the output voltage detection circuit, the control circuit, and the regulator each according to claim 9, which are formed on a same substrate.

17. A semiconductor device including the output voltage detection circuit, the control circuit, and the regulator each according to claim 10, which are formed on a same substrate.

18. A semiconductor device including the output voltage detection circuit, the control circuit, and the regulator each according to claim 11, which are formed on a same substrate.

19. A semiconductor device including the output voltage detection circuit, the control circuit, and the regulator each according to claim 12, which are formed on a same substrate.

* * * * *